Feb. 9, 1943.    G. C. PEARCE    2,310,543
DOMESTIC APPLIANCE
Filed Feb. 28, 1941    7 Sheets-Sheet 1

INVENTOR.
George C Pearce
BY
Spencer Hardman and File
attorneys

Feb. 9, 1943.  G. C. PEARCE  2,310,543
DOMESTIC APPLIANCE
Filed Feb. 28, 1941  7 Sheets-Sheet 2

INVENTOR.
George C Pearce
BY Spencer Hardman and Fehr
attorneys

Feb. 9, 1943.    G. C. PEARCE    2,310,543
DOMESTIC APPLIANCE
Filed Feb. 28, 1941    7 Sheets-Sheet 5

INVENTOR.
George C Pearce
BY Spencer Hardman
     attorneys

Feb. 9, 1943.  G. C. PEARCE  2,310,543
DOMESTIC APPLIANCE
Filed Feb. 28, 1941  7 Sheets-Sheet 6

INVENTOR.
George C Pearce
BY Spencer Hardman and Fehr
Attorneys

Patented Feb. 9, 1943

2,310,543

UNITED STATES PATENT OFFICE 2,310,543

DOMESTIC APPLIANCE

George C. Pearce, Dayton, Ohio, assignor to General Motors Corporation, Dayton, Ohio, a corporation of Delaware Application February 28, 1941, Serial No. 381,193

10 Claims. (Cl. 74—1)

This invention relates to a cycling control in which the operating means first renders one device inoperative or operative for successive cycles prior to the customary operation of a second device. One of its applications is to electric range controls which will be used to illustrate its operation.

At present, the better electric ranges are equipped with mechanical means operated by the opening movement of the oven thermostat for moving a switch to automatically change the circuit arrangement of the oven from the preheat arrangement to the baking arrangement at the end of the first heating cycle. This feature adds a load upon the thermostat, causing it to overshoot upon the first temperature cycle of the oven and causing the attainment of a temperature from 25° to 40° F. higher than the temperature for which the thermostat is set and normally operates.

It is an object of my invention to provide, for electric ovens, an arrangement for automatically changing from the preheat circuit arrangement to the baking circuit arrangement in such a way that the operation and accuracy of the thermostat are not affected detrimentally.

It is another object of my invention to provide, for electric ovens, an arrangement for automatically changing from the preheat circuit arrangement to the baking circuit arrangement, in which the change of circuits takes place just prior to the termination of the first energizing cycle of the heating means.

It is another object of my invention to provide a thermostat in which certain auxiliary contacts are operated by the temperature actuating means just prior to the opening movement of the main contacts.

It is another object of my invention to provide an improved, simple, accurate thermostat for ranges.

It is another object of my invention to provide a lost motion connection between the actuating means of the thermostat and the control device operated by the thermostat for operating a circuit-changing means.

Further objects and advantages of the present invention will be apparent from the following description, reference being had to the accompanying drawings, wherein a preferred form of the present invention is clearly shown.

Brief description

Figure 1:
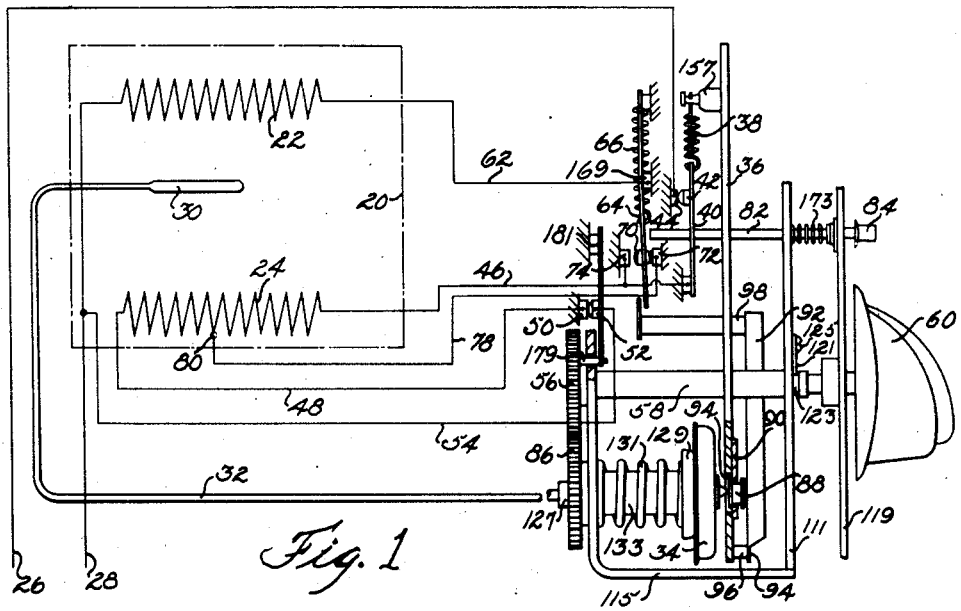
Fig. 1 is a view, partly diagrammatic, of an electric oven control and oven wiring diagram illustrating one form of my invention with the control set in the baking circuit arrangement.

Briefly, I have shown, in the drawings, a control for an electric oven of the two-unit tap-circuit type wherein both the upper and lower units are connected directly across the supply conductors for preheating purposes; while, for baking the lower unit is connected directly across the supply conductors while the upper unit is connected to one of the supply conductors and a tap upon the lower unit. A thermostatic control is provided for connecting and disconnecting the heating units from the supply conductors and is provided with a switch which may be manually set to connect the heating units in the preheat circuit arrangement. The thermostat control is provided with a lost motion connection between the actuating diaphragm and the switch lever through which the manually set switch is returned from the preheat position to the position providing a baking circuit arrangement. This operation of the manually set switch takes place just prior to the time and at a slightly lower temperature than the temperature for which the switch is set to open. In this way, the actual opening of the thermostat during the preheating cycle is not affected by the operation of the manually set switch.

The diagrammatic disclosure

Referring now to the drawings and more particularly to Fig. 1, there is shown, for the purpose of illustrating the invention, an electric oven 20 provided with an upper heating unit 22 primarily for broiling purposes and a lower heating unit 24 primarily for baking purposes. The oven 20 is supplied with electric energy from the supply conductors 26 and 28. In order to thermostatically control the heating of the oven 20, I provide a thermostat bulb 30 within the oven compartment 20 which is connected by a capillary tube 32 to a diaphragm 34. This bulb 30 as well as the capillary tube 32 and the diaphragm 34 are preferably completely filled with a suitable hydraulic actuating liquid.

The expansion and contraction of the actuating liquid with the bulb 30 causes an expansion and contraction of the diaphragm 34 to operate the main lever 36 which is connected by a tension spring 38 to a leaf spring contact member 40 carrying a movable contact 42 which is adapted to engage a stationary contact 44 to close the circuit connecting the supply conductor 26 with the upper and lower units 22 and 24. The leaf spring member 40 is connected by the conductor 46 to one terminal of the lower heating unit 24, while the other terminal of the lower heating unit 24 is connected by a conductor 48 to a stationary contact 50 which, in turn, connects to a movable contact 52, in turn, connected by the conductor 54 to the supply conductor 28. These contacts 50 and 52 are operated by a cam provided in the gear 56 provided at the end of the knob shaft 58 opposite the control knob 60. The cam is so arranged that the contacts 50 and 52 remain in closed position, excepting in the "off" and "broil" positions of the knob 60.

One terminal of the upper heating unit 22 is also connected to the supply conductor 28 while the other terminal is connected by the conductor 62 to the leaf spring contact member 64 provided with an over-center or toggle spring 66 for holding the movable contacts 70 into engagement with either of the stationary contacts 72 or 74. When the oven is connected in the "bake" circuit arrangement, the movable contact 70 is in contact with the stationary contact 72 which connects the second terminal of the upper heat unit with the conductor 78 which connects to a tap 80 provided upon the lower heating unit 24 so that in the baking circuit arrangement the lower unit will operate at full wattage while the upper unit will operate at less than one-fourth wattage to provide uniform baking conditions throughout the interior of the oven 20.

The preheat cycle

Figure 2:
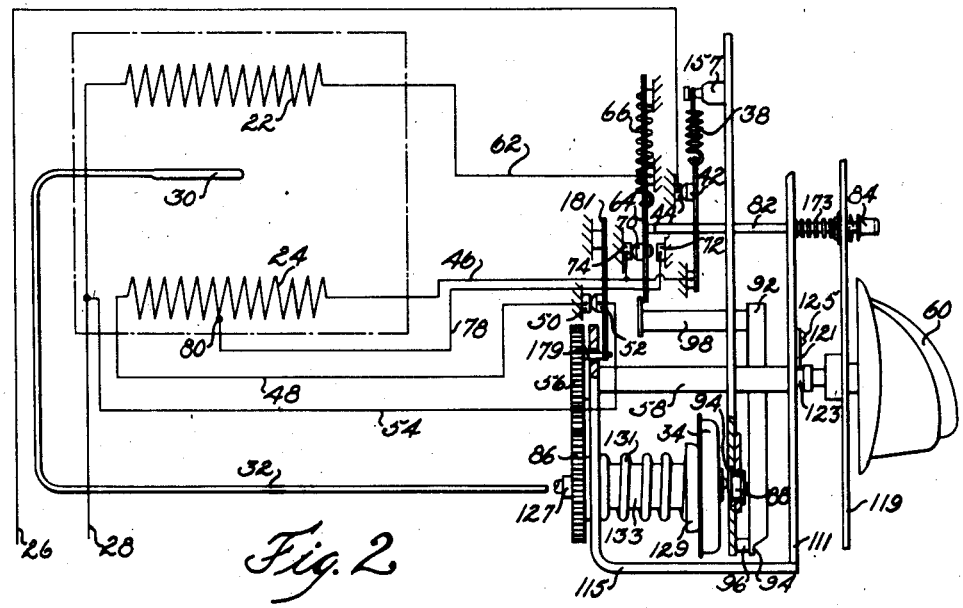
Fig. 2 is a similar view showing the control in the preheat circuit arrangement.

For quick preheating purposes, a pin 82, provided with a push button 84, is pushed to the left so that the left end of the pin engages the contact carrying strip 64 to carry it over the dead-center position so that the contact 70 will be moved out of engagement with the contact 72 and into engagement with the contact 74, as shown in Fig. 2. This connects the upper unit 22 directly across the supply conductors along with the lower unit 24 to provide full wattage input for each for quickly preheating the oven. At the same time, the knob 60 will be turned to one of the temperature regulating positions. By turning the knob 60, the shaft 58 as well as the gear 56 will be turned so that a portion of the cam in the gear 56 is presented, which will allow the contacts 50 and 52 to close.

There is also provided a second gear 86 which is meshed with the gear 56 to move the diaphragm 34 away from the main switch-operating lever 36. This retraction of the diaphragm 34 from the main switch lever determines the temperature at which the thermostat contacts 42 and 44 will be opened and closed. The diaphragm 34 is not provided with a permanent connection with the main switch lever 36 but, instead, operates through a lost motion button 88. This lost motion button 88 is shaped like a miniature spool and is retained within an aperture provided in a metal member 90 which is fastened to the main switch lever 36 and holds the button 88 in registration with a larger aperture 92 provided in the main lever 36. The flanges of the button 88 are spread more widely than the thickness of the member 90 so that the button 88 has a certain amount of limited movement which is limited by the flanges upon the button 88.

Mounted upon the lever 36 is an auxiliary lever 92 which is connected at its lower end by a spring pivot connection 94 with a post 96 provided upon the adjacent end of the main lever 36. The spring pivot connection 94 is sprung in such a manner that the auxiliary lever 92 will lightly bear against the button 88 so that, when the diaphragm 34 is retracted by the setting of the knob 60 to one of the operating temperature positions, the button 88 will move toward the diaphragm 34 until the flange located between the member 90 and the lever 92 engages the adjacent edge of the member 90. The button 88 and the lever 92 are shown arranged in this position in Fig. 2.

The lever 92, at its upper end, carries a post 98 carrying a plate 101 which is adapted to engage the lower end of the contact-carrying leaf spring 64 when the lever 92 moves in a clockwise direction. When the oven approaches the temperature for which the knob 60 is set, the diaphragm 34 expands to cause its conical operating projection to engage the button 88 and move it within the limitations of its lost motion to move the lever 92 in a clockwise direction. Thus, this lost motion movement of the button 88 by the expansion of the diaphragm 34 will move the auxiliary lever 92 without moving the main lever 36 and this clockwise movement of the auxiliary lever 92 will cause the plate 101 to engage the lower end of the contact-carrying lever spring 64 and move the contact 70 from engagement with the contact 74 into engagement with the contact 72 to terminate the preheat circuit arrangement and set up the baking circuit arrangement. This is preferably accomplished about 25° to 50° F. lower than the temperature for which the knob 60 is set.

The structural disclosure

Referring now more particularly to the remaining figures of the drawings, there is shown a channel-shaped frame member 111 provided with a transverse plate 113 at one end. At the opposite end there is provided an L-shaped metal cover 115 which is fastened to the channel-shaped member 111 by the screws 117. The control is adapted to be fastened to the rear of a control panel 119 provided for a range. The knob 60 and the push button 84 protrude from the control panel 119. The knob shaft 58 extends through the L-shaped member 115 which is provided with a suitable bearing and through the channel-shaped base 111 which is also provided with a suitable bearing for this shaft. This shaft is held in place axially by a locking member 121 which engages a groove 123 provided in the shaft 58. The locking member 121 is normally fastened in place by a screw 125. The knob 60 is removably connected to the outer end of the shaft 58.

Figure 10:
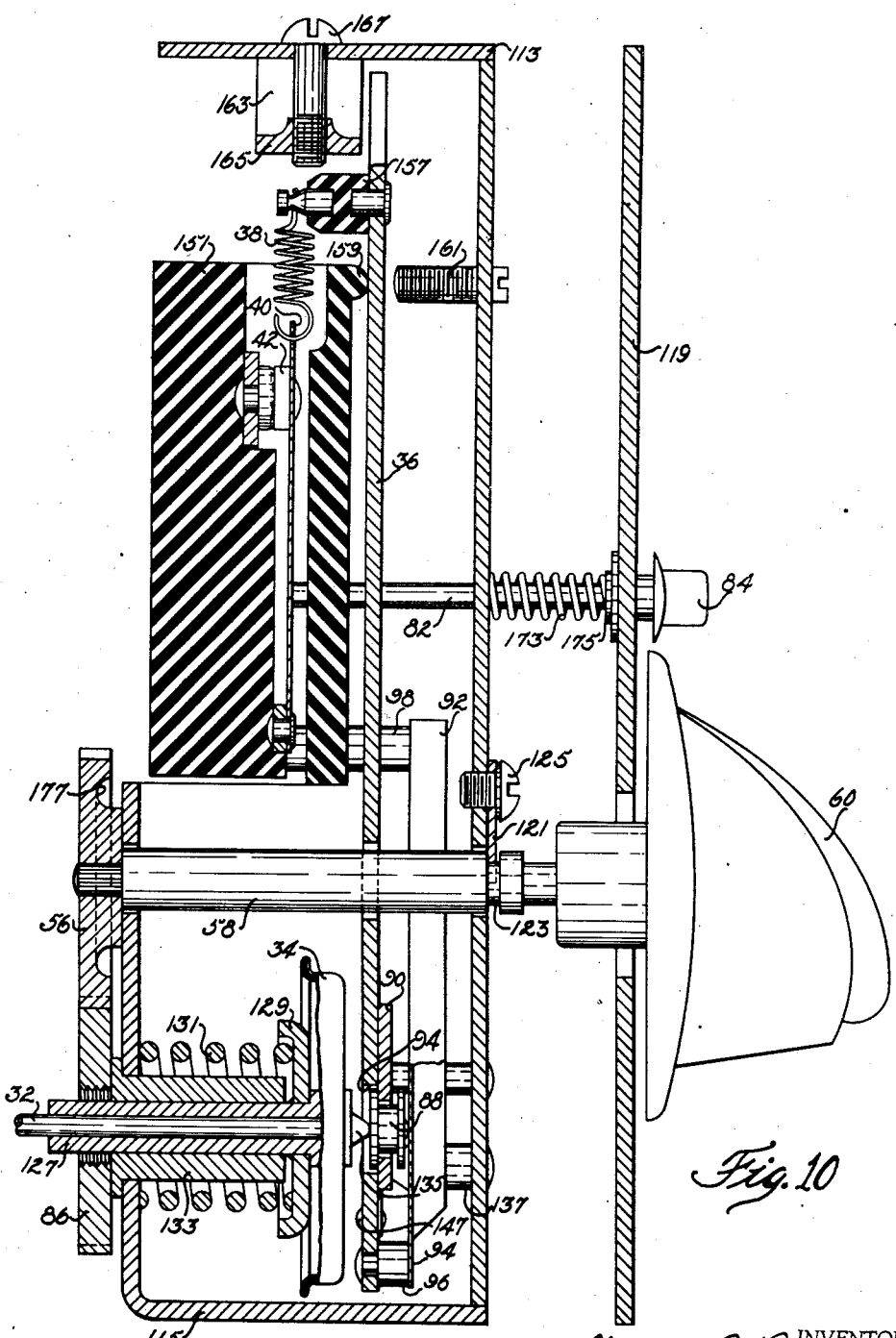
Fig. 10 is a sectional view taken along the line 10—10 of Fig. 9.

The gear 56 at the rear end of the shaft 58 meshes with the gear 86 which is provided with a threaded aperture. This threaded aperture within the gear 86 is threaded upon a threaded projecting member 127 provided with flats upon its upper and lower sides. This projecting member 127 receives the end of the capillary tube 32 and fastens to the rear wall of the diaphragm member 34. It carries a spring retainer 129 provided with an aperture adapted to receive the flatted shank of the member 127 and to rest against the shoulders provided at the ends of the flatted portions as shown in Fig. 10. A compression type coil spring 131 is lodged between the spring retainer 129 and the wall of the member 115 so as to hold the gear 86 against the outer end of the bushing 133 within which the projecting member 127 is slidably held. By this means, the rotation of the knob 60 will turn the shaft 58 and the gear 56 in order to rotate the gear 86 upon the threaded projecting member 127 so that the diaphragm 34 is retracted or advanced relative to the main lever 36 when it is desired to obtain higher or lower oven temperatures.

The capillary tube 32 connects to the interior of the diaphragm 34 which is formed of two discs fastened together at their flanged edges. The front wall carries a conical actuating pin 135 which is adapted to engage the button 88 which in turn makes a lost motion connection with the piece 90 which is fastened to the main lever 36. The main lever 36 is pivoted upon a pair of conically pointed pins 137 which extend from the channel-shaped base 111 into contact with two points 139 and 141 upon the main lever 36. In order to hold the main lever 36 upon these points when the diaphragm 34 is retracted by the turning of the knob 60, there is provided a U-shaped leaf spring member 143 which has its legs riveted to the pins 145 projecting from the base 111 and its base portion riveted by the rivets 147 to the main lever 36. This U-shaped leaf spring member 143 is provided with small apertures 149 providing clearance for the ends of the conical-shaped pivot points 137. Thus, by this construction the main lever 36 is always held in its proper relation with the conical points 137.

As mentioned in connection with Figs. 1 and 2, the lower end of the main lever 36 carries a post 96 which in turn carries the auxiliary lever 92 provided with a spring hinge 94 which is so sprung to tend to turn it in a clockwise direction so that it will always bear against the rounded projection provided upon the button 88. As is clearly shown in Fig. 10, the button 88 is in the shape of a spool and is retained in position by the plate member 90 which has an aperture receiving the shank of the spool. The button 88 is formed by providing a flanged collar and inserting it within the aperture in the plate member 90 after which the second flange is riveted in place. The flanges are sufficiently large to engage the edges of the aperture in the plate member 90, but the flanges are spaced sufficiently to allow a limited lost motion connection between the button 88 and the plate member 90. As shown in Fig. 10, the main lever 36 is provided with a clearance aperture for the button. The plate member 90 is rigidly fastened to the main lever 36.

It will be seen that when the oven is in a cold condition and the knob 60 is turned to a warm position corresponding to any desired baking temperature, that the diaphragm 34 will be retracted from the main lever 36 by the rotation of the knob through the shaft 58 and the gears 56 and 86. This will allow the auxiliary lever 92 to turn in a clockwise direction a limited distance with respect to the main lever 36 in order to allow the contact 70 to be pushed by the push button 84 into engagement with the contact 70 and to cause the button 88 to rest with the flange nearest the auxiliary lever 92 in engagement with the member 90. When the temperature of the oven approaches the temperature for which the knob is set, the diaphragm 34 will be expanded sufficiently to cause the conical projection 135 to engage the button 88 and move the auxiliary lever 92 without applying any movement to the main lever 36 until the flange upon the button 88 nearest the diaphragm 34 engages the plate member 90 and directly operates the main lever 36 to open-circuit position. As mentioned before, the auxiliary lever 92 carries a post 98 which at its opposite end carries a plate 101.

The base 111 carries an insulating construction 151 of insulating material which carries all of the contact mechanism proper. This includes a connector plate 153 provided with a binding screw. This connector plate 153 is riveted to a portion of the insulating construction 151 and has a projecting portion which is riveted to the stationary end of the leaf spring contact-carrying strip 40. The other end of this strip carries the movable contact 42 which in turn is adapted to make contact with the stationary contact 44 riveted to a second connector member 155, likewise provided with a binding screw. The movable contact 42 is opened and closed by the spring 38 which is hooked to the free end of the leaf spring member 40 and to the insulated post 157 which projects from the main lever 36. The insulating construction 151 is provided with a projection 159 which serves to limit the movement of the main lever to the closed position. The opening movement of the main lever 36 is adjustable and is limited by a set screw 161 extending through the base 111. If desired, the closing movement of the main lever 36 may be similarly adjusted by a set screw.

In order to provide a snap-action for the main lever 36 to provide quick opening and closing of the contacts 42 and 44, I provide a permanent magnet 163 which is clamped to the end member 113 by a clamping bar 165 and the clamping screws 167 so that it will attract the extreme upper end of the main lever. This magnet 163 may be adjusted toward or away from the main lever 36 to obtain the desired movement. It will be seen that this construction provides a simple range thermostat.

Figure 7:
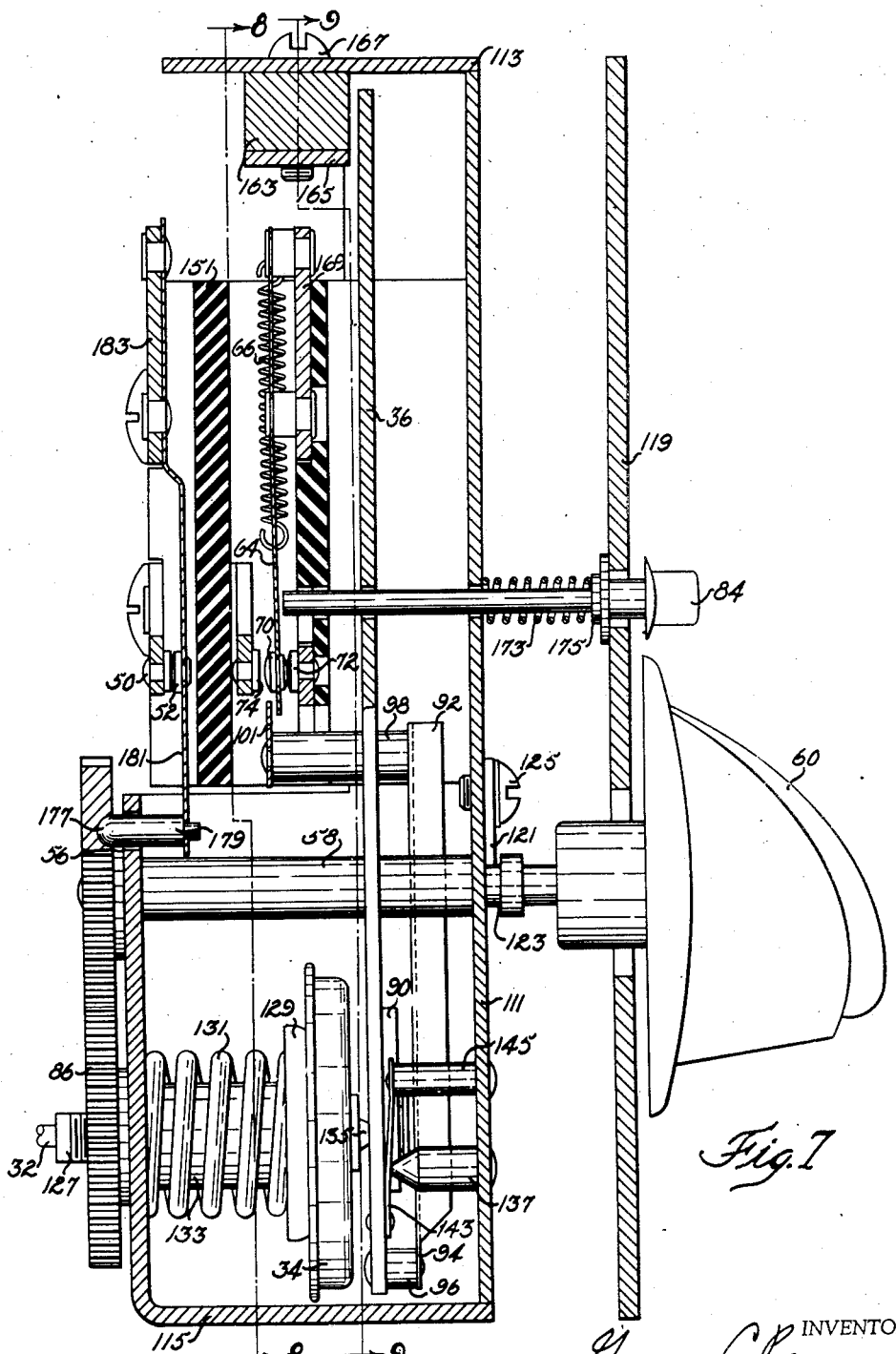
Fig. 7 is a sectional view taken along the line 7—7 of Fig. 6.
Figure 8:
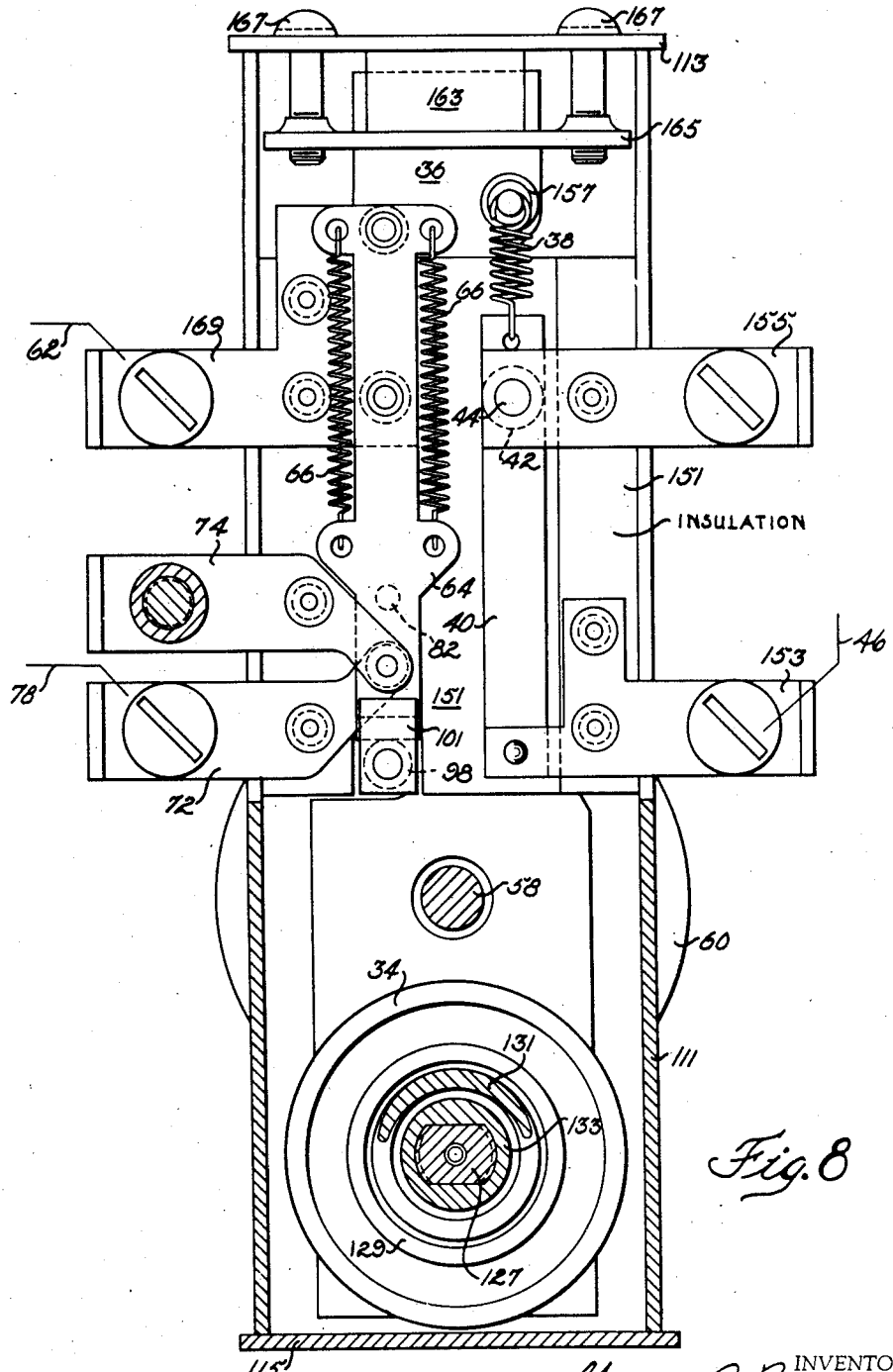
Fig. 8 is a sectional view taken along the line 8—8 of Fig. 7.
Figure 9:
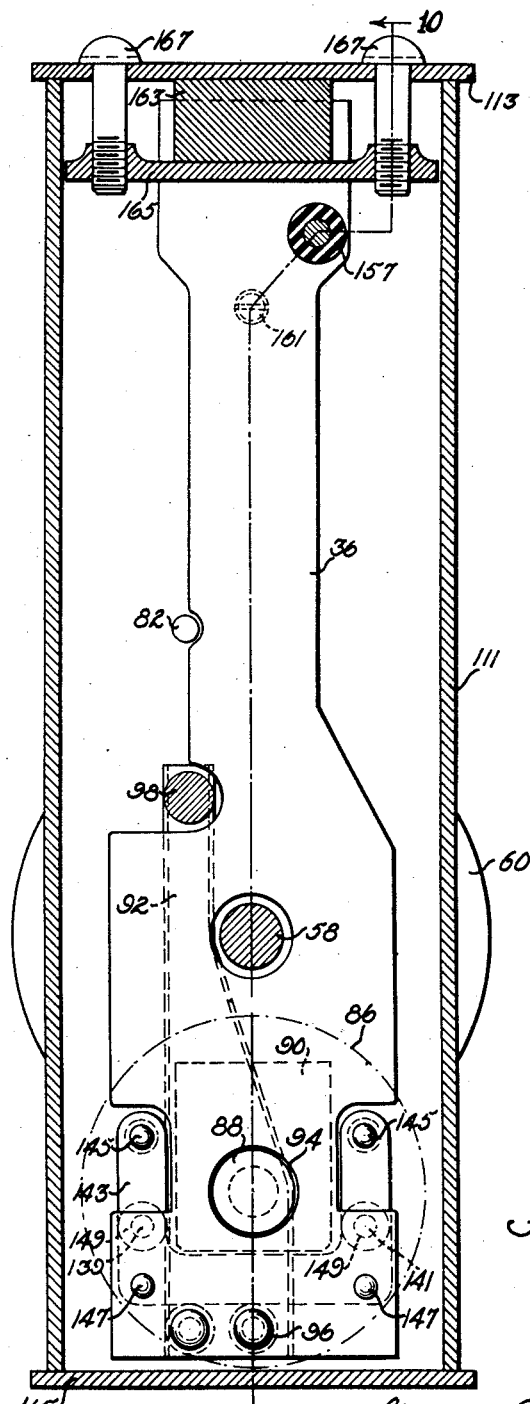
Fig. 9 is a sectional view taken along the line 9—9 of Fig. 7.

For the "preheat-baking" control, I provide the toggle switch 64 formed of a leaf spring which is fastened to the connector plate 169 which in turn is riveted to the insulating construction 151. This leaf spring 64 is provided with eyelets on opposite sides between which extend the toggle or over-center springs 66 which tend to keep movable contact 70 upon the free lower end of the leaf spring 64 in contact with either the contact member 74, located upon the one side, or the contact member 72, located upon the other side of the movable contact 70. As is best shown in Fig. 7, the "preheat" button 84 projects from the control panel 119. A compression type coil spring 173 extends between the base 111 and a flange 175 provided upon the pin 82 for projecting the button 84 from the control panel 119 and for carrying the pin 82 out of engagement with the leaf spring member 64.

When the movable contact 70 is in engagement with stationary contact 72 the upper heating unit 22 is connected to the tap 80 in the lower heating unit. For rapid preheating, the push button 84 is pressed inwardly to cause the pin 82 to engage the leaf spring 64 to carry the leaf spring 64 over its center into contact with the stationary contact 74 which serves to connect the upper heating unit across the supply conductors as has been explained heretofore. This "preheat," however, is only used when the oven is being started from a cold condition after the knob 60 is turned from "off" to a baking temperature position so that the diaphragm is retracted from the main lever as has been heretofore explained. The expansion of the diaphragm 34 then operates the button 88 and the auxiliary lever 92 to cause the plate 101 to engage the free end of the leaf spring member 64 to carry the movable contact 70 out of contact with the contact 74 and into engagement with the contact 72 to change the circuits from the "preheat" to the "bake" circuit arrangement.

Figures 3, 4, 5:
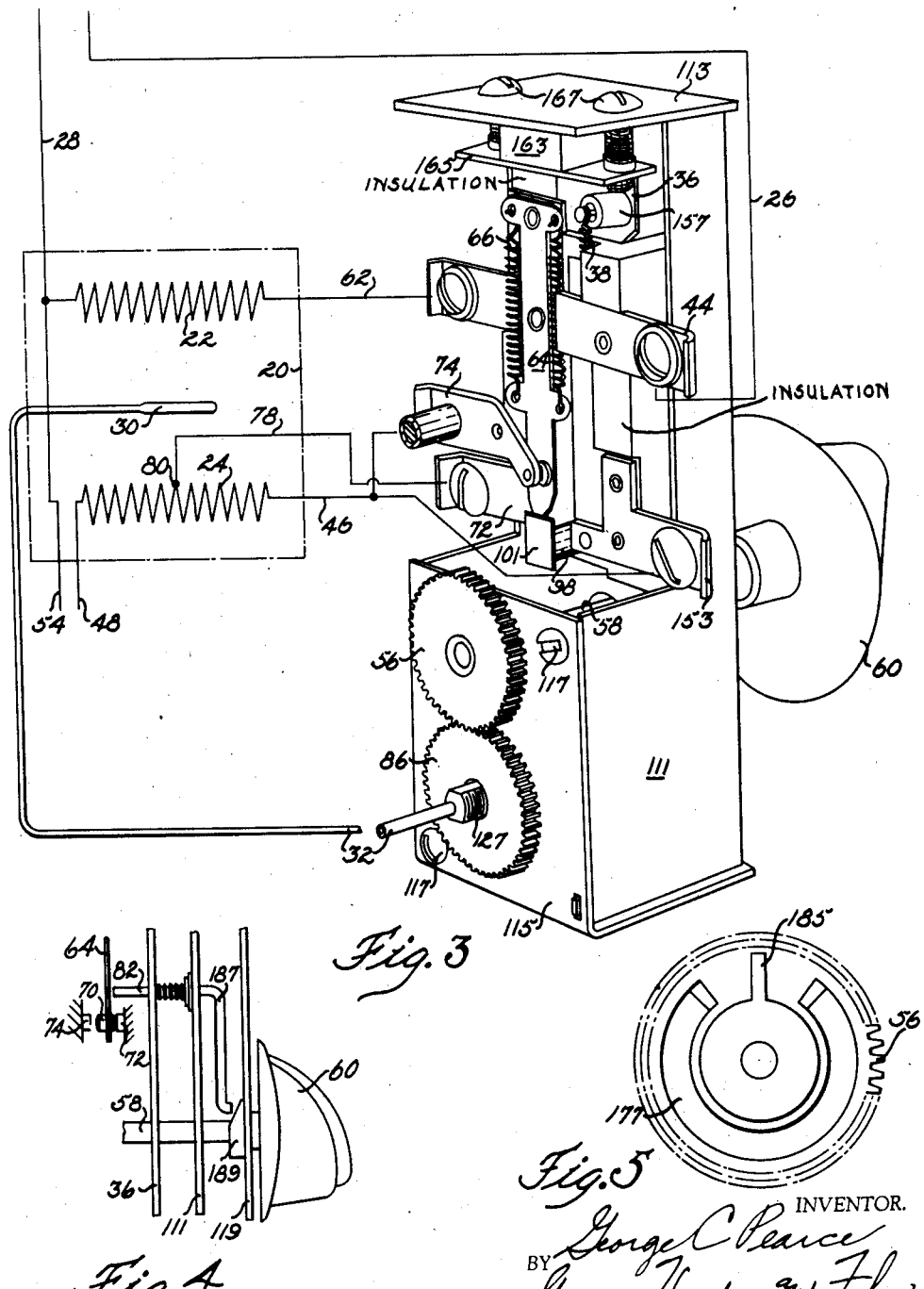
Fig. 3 is a fragmentary perspective view of the practical embodiment of the control together with a wiring diagram of the oven.
Fig. 4 shows a modification of the control shown in Fig. 3 in which a single knob arrangement is provided for setting the control to all circuit arrangements.
Fig. 5 is a view of the cam gear shown in Fig. 3.
Figure 6:
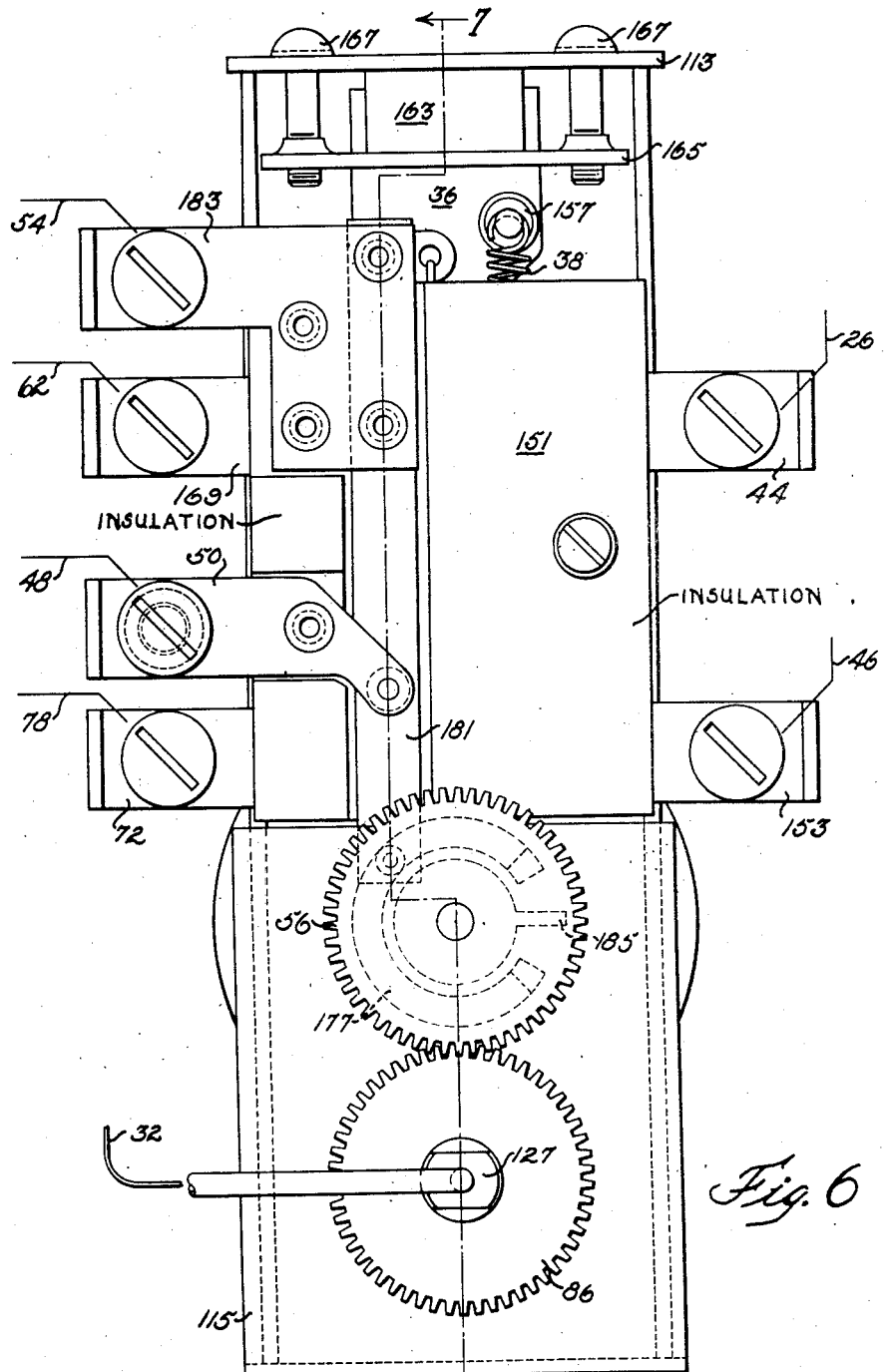
Fig. 6 is a front view of the control shown in Fig. 3.

The gear 56 is provided with a cam groove 177 which receives the rounded end of a follower pin 179 of insulating material which extends through an aperture in the L-shaped member 115 and is provided with a reduced projection extending through an aperture in the lower free end of the leaf spring contact-carrying member 181 which carries the movable contact 52. The upper end of this leaf spring member 181 is riveted to a connector member 183 provided with a binding screw for connection with the conductor 54. The stationary contact member 50 is provided with a binding screw for connection to the conductor 48. The separation of the contacts 50 and 52 disconnect the lower heating unit 24 from the supply conductor 28 without disconnecting the upper heating unit 22. As is best shown in Figs. 5 and 6 the cam groove 177 extends more than three-fourths of a revolution in the rear face of the gear 56. This makes the groove C-shaped and the ends of the groove are provided with ramps so that the pin 179 will be projected away from the gear when it reaches either end of the cam groove 177. A stop projection 185 is provided upon the flat surfaces between the ends of the cam groove to stop the operation of the knob 60 and the shaft 58 to prevent more than one revolution from taking place. When the cam follower pin 179 engages one side of the stop projection 185 the knob will be in the "off" position wherein the leaf spring member 81 will be deflected to hold the contacts 50 and 52 separated. At the same time the contacts 42 and 44 will be separated by reason of the temperature condition of the thermostat, so that the oven circuits will be completely deenergized. When the knob 60 is turned completely to the opposite end of its movement, the opposite side of the stop projection 185 will engage the cam follower pin 179 and the leaf spring member 181 will again be deflected to separate the contacts 50 and 52. This insures deenergization of the lower heating unit 24 for broiling purposes while the contacts 42 and 44 are closed by the condition of the thermostat which is adjusted to a high temperature position. For broiling, it is also necessary to push inwardly the "preheat" button 84 which causes the pin 82 to engage the leaf spring member 64 to move the contact 70 into contact with the stationary contact 74 which in turn is connected to the leaf spring member 40 carrying the contact 42 which is in engagement with the stationary contact 44 which connects to the other supply conductor 26 to connect the upper heating unit 22 directly across the supply conductor for broiling purposes. For an ordinary size insulated oven, I prefer to use an upper unit of about 2700 watts rating and a lower unit of about 2000 watts rating.

*Single knob disclosure*

In Fig. 4, I have shown a modification wherein the necessity of operating the push button 84 for "preheat" and broiling purposes is eliminated. This is done by providing a bent extension 187 of the pin 82 which extends into contact with a cam surface 189 provided upon the knob shaft 58 which engages the end portion of the pin 82 when the knob 60 is in the "broil" position in order to move the pin 82 into engagement with the leaf spring member 64 to move the contact 70 into engagement with the stationary contact 74. This of course provides the "broil" position. In this modification this position is also used to set the control into the "preheat" circuit arrangement after which the knob is turned from the "broil" position to any one of the selected baking temperature positions of the thermostat. When this latter procedure is followed a single "preheat" cycle is provided in the same way as when the push button 84 is operated in the other modification.

Thus, I have provided a simple accurate thermostat of few parts which is provided with an automatically resetting preheating arrangement which is reset by the action of the actuating diaphragm 34 just prior to the time the diaphragm acts to open the main thermostat contacts. In this way the power employed for automatically changing the movable contact 70 from the "preheat" position to the baking circuit position is derived from the diaphragm 34 during the time the main thermostat contacts remain in the closed position. Thus, since there is no operation of the main thermostat contacts, the use of the diaphragm 34 at this time for operating the movable contact 70 does not detrimentally affect the operation of the thermostat. The operation of the main thermostat contacts does not take place until this change from "preheat" to the "bake" circuit arrangement has been entirely completed. Thereafter, when the thermostat does reach its proper opening temperature it will open at the proper point without its accuracy being disturbed by the previous change from the "preheat" to the "bake" circuit arrangement.

While the form of embodiment of the invention as herein disclosed, constitutes a preferred form it is to be understood that other forms might be adopted, all coming within the scope of the claims which follow.

What is claimed is as follows:

1. A control comprising a single operating means, a first control device, a second control device, a lost motion operating connection between the operating means and the first control device for operating the first control device after the completion of the lost motion movement, means operated by said operating means during said lost motion movement for operating said second control device, adjusting means for varying the operative relationship between the operating means and the first control device, setting means for setting said second control device, and common means for operating said adjusting means and said setting means.

2. A control comprising a common operating motor, a first control device, a second trip device having first and second positions, a lost motion operating connection between the operating motor and the first control device for operating the first device after the completion of the lost motion movement, means for tripping the trip device from the first to the second positions, and means operated by said operating motor during said lost motion movement for tripping said trip device from the second to the first position.

3. A control comprising an operating motor, a control device, means for limiting the movement of the control device, and means for moving the entire motor toward or away from the control device to vary the relationship between the movement of the motor and the operation of the control device.

4. A control comprising an operating motor, a lever follower for the motor, a control device operated by the movement of the lever follower, and means for moving the motor toward or away from the control device to vary the relationship between the movement of the motor and the operation of the control device.

5. A control comprising a first control device having a first critical point of operation, a second control device having a second critical point of operation, a connection connecting said first and second control devices, a motor beginning its stroke in one direction to move the connection to first move the second control device through said second critical point of operation without moving the first device and in a continuation of the stroke in said one direction to move the first control device through its first critical point of operation and terminating the stroke of the motor in said one direction upon the termination of the movement of said first control device, and means rendering one of said control devices inoperative by said motor after being once moved at one of said critical points of operation.

6. A control including a first lever, a device connected to the first lever having a critical point of operation, a second lever, a snap-acting device having a critical point of operation operated by the second lever upon a predetermined amount of movement thereof, a lost motion connection having a greater amount of lost motion than said predetermined amount, a motor for operating said lost motion connection and having a greater amount of movement than said lost motion, said motor having one end of its stroke beginning a movement of the lost motion connection to first operate the second lever and its snap-acting device through the critical point and continuing in the same direction to operate the first lever through the critical point of operation of its device and terminating its stroke when the first lever passes the critical point of operation of its device.

7. A control comprising first and second members, a lost motion member having a lost motion connection with the first member and operatively connected to the second member, the lost motion of the lost motion connection being greater than the required movement of the second member, a motor for operating said lost motion connection having a stroke greater than the lost motion and beginning with the beginning of the lost motion and terminating with the completion of the movement of the first member, and means for moving the motor as an entity toward and away from said lost motion connection to vary the operative relationship between said members and the motor.

8. A control comprising a first lever, a second lever pivotally mounted upon the first lever, a first device connected to and operated by said first lever, a second device connected to and operated by said second lever, a lost motion connection connecting the first and second levers and allowing a limited movement of the lost motion connection and the second lever without corresponding movement of the first lever, and a motor operatively connected to said lost motion connection and beginning its stroke in one direction substantially with the beginning of the lost motion and ending its stroke in said one direction after the completion of the lost motion.

9. A switch comprising an operating motor, a first lever, a switch mechanism controlled by said first lever, a second lever, a switch mechanism operated by said second lever, a member operably connected to said second lever and said operating motor and having a lost motion connection with said first lever greater in amount than the movement required to operate the second lever and its switch mechanism from one circuit changing position to another, said operating motor having a stroke sufficiently long to move said member throughout said lost motion to first operate the switch mechanism of said second lever and then move the first lever and operate its switch mechanism.

10. A control comprising a first control device having a first critical point of operation, a second control device having a second critical point of operation, motor means having connections with said control devices to move the first control device through its first critical point of operation without moving the second control device and thereafter to move the second control device through its second critical point of operation, and means rendering one of said control devices inoperative by said motor means after being once moved at one of said critical points of operation.

GEORGE C. PEARCE.